US008452088B1

(12) United States Patent
De Ponti et al.

(10) Patent No.: US 8,452,088 B1
(45) Date of Patent: May 28, 2013

(54) CONTENT-BASED DIGITAL-IMAGE CLASSIFICATION METHOD

(75) Inventors: Mauro De Ponti, Seregno (IT); Raimondo Schettini, Milan (IT); Carla Brambilla, Varese (IT); Anna Valsasna, Saronno (IT); Gianluca Ciocca, Cassano d'Adda (IT)

(73) Assignee: STMicroelectronics S.r.l., Agrate Brianza (IT)

(*) Notice: Subject to any disclaimer, the term of this patent is extended or adjusted under 35 U.S.C. 154(b) by 3251 days.

(21) Appl. No.: 09/714,843

(22) Filed: Nov. 15, 2000

(30) Foreign Application Priority Data

Nov. 16, 1999 (IT) .................................. T099A0996
Jan. 20, 2000 (EP) ..................................... 00830029

(51) Int. Cl.
*G06K 9/00* (2006.01)
*G06K 9/62* (2006.01)

(52) U.S. Cl.
USPC .......................... 382/165; 382/170; 382/224

(58) Field of Classification Search
USPC .. 382/159, 165, 170, 224, 226, 227; 358/467; 707/104.1
See application file for complete search history.

(56) References Cited

U.S. PATENT DOCUMENTS

| | | | | |
|---|---|---|---|---|
| 5,280,547 A * | 1/1994 | Mahoney | ...................... | 382/302 |
| 5,546,474 A | 8/1996 | Zuniga | .......................... | 382/176 |
| 5,915,250 A | 6/1999 | Jain et al. | ...................... | 707/100 |
| 5,963,670 A * | 10/1999 | Lipson et al. | ................. | 382/224 |
| 5,963,966 A | 10/1999 | Mitchell et al. | ............... | 707/513 |
| 5,974,163 A | 10/1999 | Kamei | ........................... | 382/125 |
| 6,185,328 B1 * | 2/2001 | Shiau | ............................ | 382/173 |
| 6,229,923 B1 * | 5/2001 | Williams et al. | .............. | 382/224 |
| 6,269,358 B1 * | 7/2001 | Hirata | ............................... | 707/1 |
| 6,347,153 B1 * | 2/2002 | Triplett et al. | ................. | 382/224 |
| 6,480,627 B1 * | 11/2002 | Mathias et al. | ............... | 382/224 |
| 6,549,658 B1 * | 4/2003 | Schweid et al. | .............. | 382/173 |
| 6,549,660 B1 * | 4/2003 | Lipson et al. | ................. | 382/224 |
| 6,580,824 B2 * | 6/2003 | Deng et al. | .................... | 382/165 |

OTHER PUBLICATIONS

Yang, "A sematic classification and composite indexing approach to robust image retrieval", I.E.E.E: image processing Oct. 24, 1999; pp. 134-138 vol. 1.*
Perlmutter, "Bayes risk weighted vector quantization with CART estimated class posteriors", I.E.E.E: Acoustics, Speech, and Signal Processing, 1995; pp. 2435-2438 vol. 4.*
Yang, "Interactive image retrieval : concept, procedure and tools", I.E.E.E: Signals, Systems and Computers, 1998; pp. 261-265 vol. 1.*
Vailaya, "Content-based hierarchical classification of vacation images", I.E.E.E: Multimedia Computing and Systems, 1999; pp. 518-523 vol. 1.*
Chou, P. A., "Optimal Partitioning for Classification and Regression Trees," *IEEE Transactions on Pattern Analysis and Machine Intelligence*, 13(4):340-354, Apr. 1991.
Giesen, R. J. B. et al., "Construction and Application of Hierarchical Decision Tree for Classification of Ultrasonographic Prostate Images," *Medical and Biological Engineering and Computing*, 34(2):105-109, Mar. 1996.
Hirata, K. et al., "Integrating Image Matching and Classification for Multimedia Retrieval on the Web," *Proceedings of IEEE International Conference on Multimedia Computing and Systems*, vol. 1, pp. 257-263, Jun. 1999.

* cited by examiner

*Primary Examiner* — Brian Le
(74) *Attorney, Agent, or Firm* — Seed IP Law Group PLLC

(57) ABSTRACT

A method of classification for a content-based digital-image, including: defining a set of low-level features describing the semantic content of the image, the features being quantities obtainable from the image by means of logico-mathematical expressions that are known beforehand, and the choice of said features depending upon the image classes used for the classification; indexing an image to be classified, with the purpose of extracting therefrom a feature vector, the components of which consist of the values assumed, in the image, by said low-level features; splitting the feature space defined by the low-level features into a plurality of classification regions, to each one of the regions there being associated a respective image class, and each classification region being the locus of the points of the feature space defined by a finite set of conditions laid on at least one component of the feature vector; associating the feature vector to the feature space; identifying, among the classification regions, a specific classification region containing the feature vector extracted from the image to be classified; and identifying the image class associated to the specific classification region identified.

16 Claims, 1 Drawing Sheet

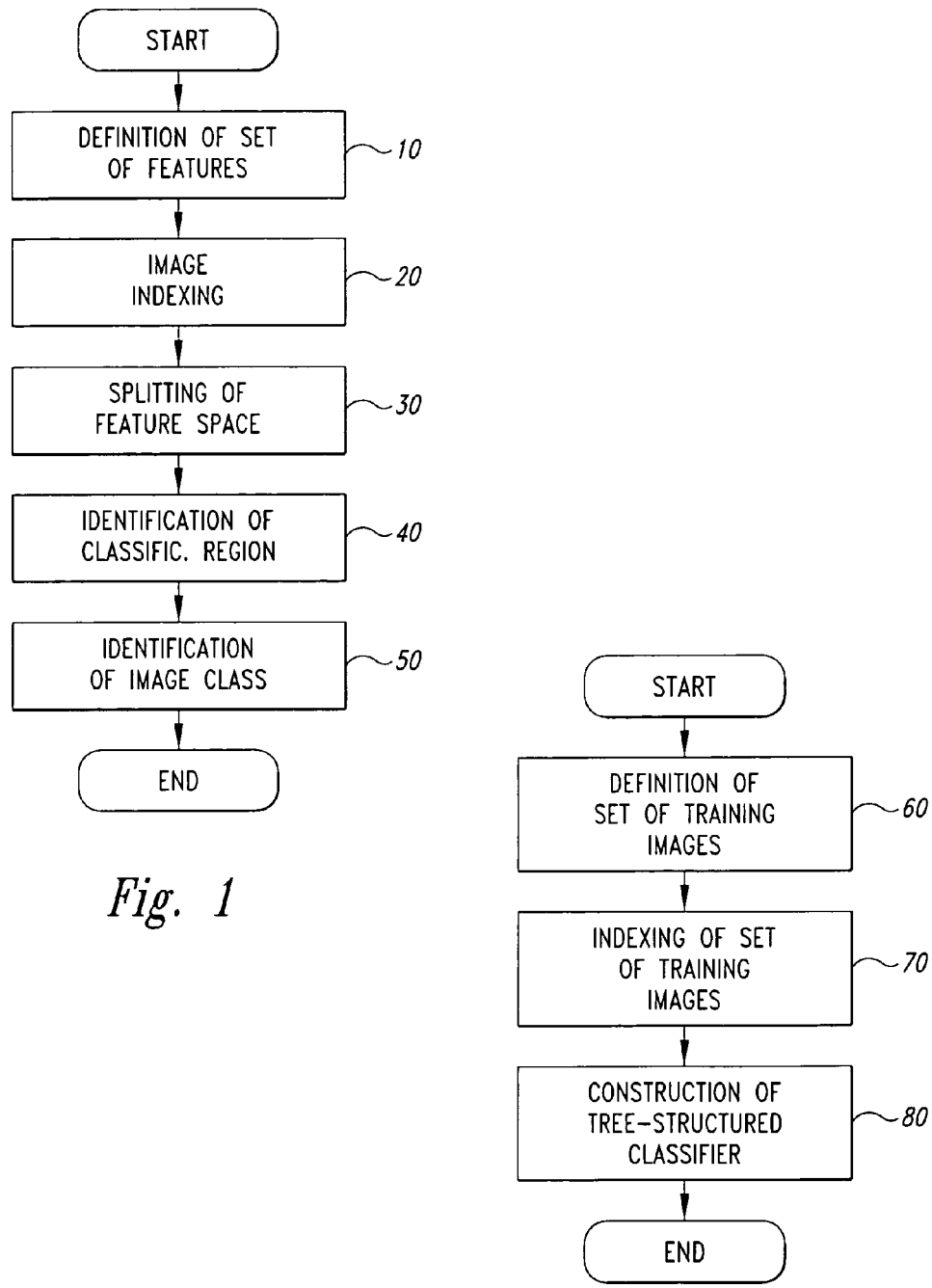

CONTENT-BASED DIGITAL-IMAGE CLASSIFICATION METHOD

TECHNICAL FIELD

The present invention regards a content-based digital-image classification method.

In particular, the present invention finds an advantageous, but not exclusive, application in the classification of images according to the following three classes: photographs, texts, and graphics. Consequently, the ensuing treatment will refer to these classes, without this implying any loss of generality.

The present invention moreover finds advantageous application in the classification of photographs according to the following three classes: outdoor, indoor, and close-ups; in the classification of outdoor photographs, according to the following four classes: landscapes, buildings, actions, and people; in the classification of indoor photographs, according to the following two classes: presence and absence of people; in the classification of close-ups, according to the following two classes: portraits and objects; in the classification of graphics, according to the following three classes: clip art, graphic illustrations (photorealistic graphics), and business graphics (tables and charts); and in the classification of texts, according to the following two classes: black and white, and color.

BACKGROUND OF THE INVENTION

As is known, Internet and the Web have become the key enablers which have motivated and rendered possible the revolution in the management of all the steps necessary for the use of images in digital format, i.e., the so-called "imaging workflow." This emerging workflow structure depends upon the effective implementation of three fundamentals steps: image acquisition, the so-called "digital way-in;" image re-utilization, the so-called "digital recirculation;" and cross-device image rendering, the so-called "digital way-out," i.e., the rendering of the images among heterogeneous devices (monitor, printer, etc.), in particular, the processing of the images for a specific purpose, such as printing or filing.

A content-based digital-image classification has by now become an indispensable need for an accurate description and use of digital images, particularly for the adoption of the most suitable image-processing strategies for satisfying the ever-increasing demand for quality of image, speed of transmission, and ease of use in Internet-based applications, such as improvement of digital images, i.e., the so-called "image enhancement," color-processing, and image compression.

At present, one of the methodologies used for content-based digital-image classification is essentially based on an approach of a heuristic type, implemented by means of expert systems. In other words, this methodology basically involves determination of the content of the image by analyzing the digital image in regions of variable size according to directions and pre-set scanning rules using an algorithm of the type "if . . . then . . . else," i.e., by evaluating the meaning of the region of interest in the light of the characteristics of the preceding or adjacent regions, as well as by the verification of a structured sequence of membership conditions with one or more rules.

Although widely used, the above methodology presents a number of drawbacks. The first drawback is represented by the computational complexity required for analysis of the high number of pixels of an image, along with the other evident drawbacks in terms of time and cost associated thereto. The second drawback is represented by the extremely complex optimization that this methodology may be subject to. The third drawback is represented by the substantial impossibility of optimizing analysis using parallel architectures. The fourth drawback is due to the not extremely high intrinsic "robustness" of the methodology, caused by the unavoidable possibility of not considering, in the above-mentioned "if . . . then . . . else" algorithm, particular cases that may arise in images.

SUMMARY OF THE INVENTION

An embodiment of the present invention provides a content-based digital-image classification method free from the drawbacks of the known methods.

According to an embodiment of the present invention, a content-based digital-image classification method is provided that overcomes the limitations of the prior art by providing a classification method that describes the semantic content of an image by defining a set of N low-level features, including quantities obtained from the image by use of pre-determined logico-mathematical expressions; indexes the image to be classified to extract therefrom a feature vector formed by the values assumed, in the image, by the N low-level features; and identifies a class of the image by processing the feature vector according to a processing algorithm.

According to one aspect of the invention, the processing of the feature vector according to a processing algorithm includes: defining a feature space as a function of the N low-level features; splitting the feature space into a finite number of classification regions, each of which is associated a respective image class and each of which is the locus of the points of the feature space; associating the extracted feature vector with one of the feature spaces; identifying a specific classification region containing the feature vector; and identifying an image class associated with the classification region, whereby the image class is associated with the specific classification region identified.

According to another aspect of the invention, the defining of a feature space as a function of the N low-level features also includes defining the feature space as a function of a finite set of conditions laid on one or more components of the feature vector.

According to still another aspect of the invention, the splitting of the feature space into a finite number of classification regions also includes utilizing a tree-structured classifier utilizing recursive partitioning of the feature space according to a predetermined partition criterion.

According to another aspect of the invention, the tree-structured classifier includes a binary-tree constructed by: defining a set of training images which include multiple images having different characteristics for each image class; indexing each of the training images to extract a respective feature vector from each; and constructing the binary tree-structured classifier by performing a recursive binary partition procedure as a function of both the feature vectors extracted from the training images and the predetermined partition criterion.

According to another aspect of the invention, the construction method used in constructing the binary tree-structured classifier is substantially defined by: the predetermined partition criterion; a predetermined construction-procedure termination criterion; and a predetermined terminal-node labeling criterion, which is chosen to minimize the likelihood of image misclassification.

According to yet other aspects of the invention, the terminal-node labeling criterion used in constructing the binary tree-structured classifier includes assigning to each node an image misclassification cost relative to the node, which is indicative of the reliability of the classifier conditioned at the node; a label naming the class of images chosen among a set of predefined labels such as to minimize the image misclassification cost relative to the node; a cardinality of each node defining a total number of training images which, during the construction of the classifier, have reached the node; and a probability distribution of the labels in the node. Preferably, a label validation procedure is performed, the procedure including comparing a cardinality associated with each terminal node with a threshold cardinality, and comparing a misclassification cost associated with each terminal node with a threshold misclassification cost.

BRIEF DESCRIPTION OF THE DRAWINGS

For a better understanding of the present invention, a preferred embodiment thereof is now described, simply to provide a non-limiting example, with reference to the attached drawings, in which:

FIG. 1 shows a flowchart relative to the digital-image classification method according to the present invention; and FIG. 2 shows a flow chart relative to the construction of a binary tree-structured classifier used in the present classification method.

DETAILED DESCRIPTION OF THE INVENTION

First of all it should be emphasized that in what follows the term "images" indicates not only the complete images, but also the subimages obtained by dividing an image up (image splitting).

FIG. 1 shows a flowchart relative to the digital-image classification method according to the present invention.

According to what is illustrated in FIG. 1, the present classification method involves the following steps:

defining a set of N low-level features, which, taken together, describe the semantic content of an image, and which consist of quantities that can be obtained from the image by means of logico-mathematical expressions that are known beforehand, and their choice depends upon the image classes used for the classification (block 10);

indexing the image to be classified, with the purpose of extracting therefrom a feature vector $X=[X_1, X_2 \ldots, X_N]$ formed by the values assumed, in said image, by the N low-level features (block 20); and processing, in the way described in greater detail hereinafter, the feature vector X according to a processing algorithm so as to identify the class of the image (blocks 30-50).

In particular, the choice of the low-level features is an essential factor for a good classification of the image on the basis of its pictorial content. The following criteria of choice have guided the systematic study carried out by the applicant with the purpose of determining the features of the image that are best suited for describing the content of the image in terms of color, contrast, and form (see also the following publications: 1) P. Ciocca and R. Schettini, "A relevance feedback mechanism for content-based image retrieval," Information Processing and Management 35, pp. 605-632, 1999; and 2) I. Gagliardi and R. Schettini, "A method for the automatic indexing of color images for effective image retrieval," The New Review of Hypermedia and Multimedia 3, pp. 201-224, 1997, the complete texts of which are incorporated herein by reference):

discrimination power (the feature has a small variance within each class, and the distances between its mean values in different classes are high); and efficiency (the feature may be rapidly processed).

The study carried out by the applicant using the criteria of choice referred to above has led to the identification of the low-level features listed hereinafter, which, according to an aspect of the present invention, constitute a library of features, from among which are chosen, according to the classes of image amongst which it is aimed to carry out the classification, the N low-level features used for indexing the image:

a) the color histogram in the 64-colour quantized hue saturation value (HSV) color space;

b) the color coherence vectors (CCVs) in the 64-color quantized HSV color space; the buckets color pixels are defined as coherent or incoherent according to whether they belong or not to similarly colored regions (i.e., regions of one and the same color) having a size greater than a threshold value; for further details see, for example, G. Pass, R. Zabih, and J. Miller, "Comparing Images Using Color Coherence Vectors," ACM Multimedia 96, pp. 65-73, 1996, the complete text of which is incorporated herein by reference;

c) the 11-colour quantized color-transition histogram in the HSV color space (in particular, red, orange, yellow, green, blue, purple, pink, brown, black, gray, and white); for further details, see, for example, I. Gagliardi and R. Schettini, "A method for the automatic indexing of color images for effective image retrieval," The New Review of Hypermedia and Multimedia 3, pp. 201-224, 1997);

d) the moments of inertia of color distribution in the non-quantized HSV color space; for further details, see, for example, M. A. Snicker and M. Orengo, "Similarity of Color Images," Paper presented at the SPIE Storage and Retrieval for Image and Video Data-Bases III Conference, 1995, the complete text of which is incorporated herein by reference;

e) the moments of inertia (mean value, variance, and skewness) and the kurtosis of the luminance of the image;

f) the percentage of non-colored pixels in the image;

g) the number of colors of the image in the 64-color quantized HSV color space;

h) the statistical information on the edges of the image extracted by means of Canny's algorithm; in particular:

h1) the percentage of low, medium and high contrast edge pixels in the image;

h2) the parametric thresholds on the gradient strength corresponding to medium and high-contrast edges;

h3) the number of connected regions identified by closed high-contrast contours; and h4) the percentage of medium-contrast edge pixels connected to high-contrast edges;

i) the histogram of the directions of the edges extracted by means of the Canny's edge detector (15 bars or gaps, each having an angular width of 12°, have been used to represent the histogram); for further details, see, for example, above incorporated P. Ciocca and R. Schettini, "A relevance feedback mechanism for content-based image retrieval," Information Processing and Management 35, pp. 605-632, 1999;

j) the mean value and the variance of the absolute values of the coefficients of the subimages of the first three levels of the multi-resolution Daubechies wavelet transform of the luminance of the image; for further details, see, for example, P. Scheunders, S. Livens, G. Van de Wouwer, P. Vautrot, and D. Van Dyke, "Wavelet-based Texture Analysis," International Journal of Computer Science and Information Management, 1997, the complete text of which is incorporated herein by reference;

k) the estimation of the texture characteristics of the image based on the neighborhood gray-tone difference matrix (NGTDM), in particular coarseness, contrast, busyness, complexity, and strength (a quantity used in image-texture analysis); for further details, see, for example, the following: 1) M. Amadasun and R. King, "Textural features corresponding to textural properties," IEEE Transaction on System, Man and Cybernetics 19, pp. 1264-1274, 1989; and 2) H. Tamura, S. Mori, and T. Yamawaki, "Textural features corresponding to visual perception," IEEE Transaction on System, Man and Cybernetics 8, pp. 460-473, 1978, the complete texts of which are incorporated herein by reference);

l) the spatial-chromatic histogram of the color regions identified by means of the 11-colour quantization process in the HSV color space (for further details, see, for example, the above-incorporated publication "A relevance feedback mechanism for content-based image retrieval"), and in particular:

11) the co-ordinates of the centroid of the colors; and 12) the dispersion of the color regions (i.e., pixel regions of the same color) with respect to their centroids;

m) the spatial composition of the color regions identified by means of the 11-colour quantization process (for further details, see the above-incorporated publication "A relevance feedback mechanism for content-based image retrieval"), and in particular:

m1) the fragmentation (the number of color regions);

m2) the distribution of the color regions with respect to the center of the image; and m3) the distribution of the color regions with respect to the x-axis and with respect to the y-axis.

As may be noted, the total number of features is relatively high (389) but not necessarily constrained given that a number of direction and color histograms are used of intrinsically large size. However, the extremely different nature of the features enables reduction of the risk of classifying in the same class images that are very different from one another.

As mentioned previously, following upon indexing of the image to be classified, the feature vector $\underline{X}$ is processed according to a processing algorithm with the purpose of identifying the class of the image.

In particular, processing of the feature vector $\underline{X}$ involves the following steps:

splitting the feature space (vector space), defined by the N features selected, into a finite number of classification regions, to each of which is associated a respective image class, and each of which is the locus of the points of the feature space defined by a finite set of conditions laid on one or more components of the feature vector $\underline{X}$, or in other words, the locus of the points of the feature space in which the values assumed by one or more components of the feature vector $\underline{X}$ satisfy predetermined relations with respective threshold values (block 30);

associating the feature vector $\underline{X}$ extracted from the image to be classified to a feature space, and then identifying, amongst the various classification regions into which the feature space is split, a specific classification region containing the feature vector $\underline{X}$ (block 40); and identifying the image class associated to the specific classification region identified (block 50), the image class undergoing classification thus being the one associated to the specific classification region identified.

The classification methodology described with reference to blocks 30-50 is in practice implemented by using a binary-tree structured classifier, which is conveniently constructed according to the known Cart methodology; for a detailed treatment of this methodology, the reader is referred to the following texts:

1) L. Breiman, J. H. Friedman, R. A. Olshen, and C. J. Stone, "Classification and Regression Trees," Wadsworth and Brooks/Cole, Pacific Grove, Calif., 1984; and 2) B. D. Ripley, "Pattern Recognition and Neural Networks," Cambridge University Press, Cambridge, 1996, the complete texts of which are incorporated herein by reference.

The Cart methodology has been chosen in that it enables management of any combination of features selected from among the aforementioned list and the coexistence of different relations between the features in different classification regions of the image-characteristics space.

In addition, the Cart methodology provides a clear characterization of the conditions that control the classification, i.e., the conditions that determine when an image belongs to one given class of images rather than to another.

The procedure for construction of the tree-structured classifier basically involves carrying out a recursive binary partition of the feature space according to a predetermined binary partition criterion, from which the above-mentioned conditions that control splitting of the feature space into classification regions are drawn.

In particular, with reference to FIG. 2, the construction of the binary tree-structured classifier involves the following steps:

defining a set of training images which comprises, for each image class, a plurality of images having different characteristics (block 70);

indexing each of the training images to extract, from each one of them, a respective feature vector, the components of which are represented by the values assumed, for said training image, by the above-mentioned N low-level features (block 80); and constructing the aforesaid binary tree-structured classifier by performing a recursive binary partition procedure based on the feature vectors extracted from the training images and on a pre-set partition criterion (block 90).

In the terminology proper to the processes of construction of the trees, the feature space defined by the N low-level features is the route node, whilst the various classification regions are the terminal nodes, or leaves, of the tree, each of which is labeled with a corresponding image class.

Classification of an image is in practice performed by supplying at input to the binary tree-structured classifier the feature vector $\underline{X}$ of an image, then traversing the classifier until a terminal node is reached and associating to the image undergoing classification the image class made up of the label attached to the terminal node in which the feature vector $\underline{X}$ has finished.

The procedure for construction of a binary tree-structured classifier is substantially defined by three rules:

the node-splitting criterion adopted;

the construction-procedure termination criterion; and the terminal-node labeling criterion.

In particular:

the splitting criterion is such as to render the two descendant nodes derived from a parent node as internally homogeneous as possible in terms of types of images contained therein;

the construction-procedure termination criterion is defined by the achievement of a minimum size of the nodes (i.e., achieving of a minimum number of images within each node); and the terminal-node labeling criterion is such as to minimize the image misclassification likelihood, i.e., to minimize the expected costs deriving from a image misclassification.

In detail, the terminal-node labeling criterion involves assigning to each node of the tree-structured classifier, whether this be a terminal node or an intermediate node, the following properties:

- a label L, i.e., the name of the class of images which is chosen among a set of J predefined labels such as to minimize the expected image misclassification cost relative to the node, which is described in greater detail in what follows;
- a cardinality of the node, i.e., the total number of training images which, during the construction of the classifier, have reached the node; in mathematical form, the cardinality of the node may be expressed as follows:

$$\text{Size} = \sum_{j=1}^{J} N_j$$

in which $N_j$ is the number of training images belonging to the J image class, which, during construction of the classifier, have reached the node;

- a probability distribution of the labels in the node, i.e., for each image class the ratio between the number of training images which, traversing the classifier, have reached the node, and the cardinality of the node; in mathematical form, the probability distribution of the labels in the node may be expressed as $\{p(j\backslash \text{node})\}_{j=1}^{J}$, where:

$$p(j\backslash \text{node}) = \frac{N_j}{\text{Size}}, j = 1 \ldots J$$

- an image misclassification cost relative to the node, which is indicative of the reliability of the classifier conditioned at the node; for example, the image misclassification cost relative to the node, designated as MC, may be defined by the following formula, which represents the ratio between the number of misclassified images in the node and the cardinality of the node:

$$MC = \sum_{j=1, j \neq L}^{J} p(j\backslash \text{nodo}) \sum_{j=1, j \neq L}^{J} \frac{N_j}{\text{Size}}$$

It is pointed out that the expected image misclassification cost relative to the node coincides with the expected probability of misclassification of the images that have reached the node in the case where the image misclassification costs corresponding to the individual image classes coincide with one another.

It is moreover emphasized that numerous other formulas may be used to define an expected image misclassification cost relative to a node, these formulas being in any case required to provide an indication regarding the classifier reliability conditioned at the node.

In addition, the properties described previously can be assigned indifferently to all the nodes of the tree-structured classifier, or else only to the terminal nodes.

Finally, it is pointed out that the probability distribution of the labels in a node, the cardinality of the node, and the image misclassification cost relative to the node could be determined using a set of training images different from the one used for constructing the tree-structured classifier.

In addition, according to a further aspect of the present invention, once construction of the tree-structured classifier is completed and once the properties listed above have been assigned to its nodes, a procedure for validation of the labeling of the terminal nodes of the classifier is carried out.

In particular, the labeling validation procedure involves considering, one at a time, the terminal nodes of the classifier and, for each one of these, comparing its cardinality with a threshold cardinality, and its misclassification cost with a threshold misclassification cost.

Should the cardinality associated to the node considered be less than the threshold cardinality, or the misclassification cost associated to the node be greater than the threshold misclassification cost, then a rejected-images class is associated to the node considered, and consequently the label assigned to it during construction of the classifier is eliminated, and a "rejected images" label is assigned to that node; otherwise, the label assigned to the node during construction of the classifier is confirmed.

In general, in a problem of classification understood as assignment of objects to defined classes, it is convenient to introduce a further class of images called "rejected-images class," to which may be assigned the images that the classifier used classifies with a level of "reliability" which is not considered acceptable for the problem in question.

In a problem of image classification in which the image classes are those of photographs, graphics and texts, it is quite foreseeable, for instance, that in the rejected-images class there may finish up photographs of graphics, a few illustrations, and/or composite images, i.e., images deriving from the combination of images, each one of which belonging to one of the image classes envisaged.

The images that have reached a terminal node to which the "rejected images" label is assigned, if necessary, may anyway subsequently be classified so that, in the application considered, the consequence of a possible wrong assignment causes as little harm as possible, or else an ad hoc strategy could be applied to them, such as, for example in the case of composite images, segmentation.

In addition, the tree-structured classification methodology enables definition of the set of the conditions on the values of the low-level features which an image must satisfy for it to be assigned to the rejected-images class, this in practice being defined by the joining of those terminal nodes to which the "rejected images" label is assigned.

It is moreover emphasized that, in the terminal node labeling validation procedure, the decision on whether or not to validate the label of the terminal node may also be taken on the basis of just one of the two properties described; i.e., it may be taken by considering just the cardinality of the node, or else just the misclassification cost associated thereto.

As regards the criterion of splitting of the nodes, one of the key problems is how to define the goodness of the split. The most widely used approach is to select the split that causes the data contained in the descendant nodes to be more "homogenous" than the data contained in the parent node. A function that defines a measure of the goodness of the split is the "impurity of the nodes" function, which in practice measures the "disorder" of the image classes within the node, and the smaller the impurity of a node, the greater the goodness of the split.

In other words, to carry out splitting of a node, first of all a plurality of possible splits are generated by imposing a finite set of conditions on each component of the feature vector, and, among the various splitting possibilities, the one that maximizes the difference between the impurity of the parent node and the impurity of the descendant nodes is chosen.

Another function that may be used to measure the goodness of a splitting of a node is the reduction in deviance; for a more detailed treatment, the reader is referred to the following texts, the complete texts of which are incorporated herein by reference:
1) L. A. Clark and D. Pregibon, "Tree-based models," in Statistical Models in S, J. M. Chambers and T. J. Hastie (eds.), pp. 377-419, Chapman and Hall, London, 1992; and
2) P. McCullagh and J. A. Nelder, "Generalized Linear Models," Chapman and Hall, London, 1989.

In general, tree-structured classifiers may be very big and overloaded with data, even though they define poor models of the structure of the problem. One of the significant advantages of the Cart methodology is that "the explanatory tree" originally obtained may be pruned, and the pruning procedure produces a sequence of subtrees, the performance of each one of these subtrees, in terms of misclassification likelihood, or of expected misclassification costs, being evaluated on the basis of sets of test images not present in the set of training images, or else by means of the so-called "cross validation approach" applied to the set of training images.

The use of the best trees of the sequence of pruned trees as classifiers, instead of the explanatory trees, yields more parsimonious classifiers and reduces the marked dependence of the predictions upon the set of training images.

The present classification method has been subjected by the applicant to a test on a so-called high-level classification problem, in which it was necessary to distinguish photographs from graphics and texts. In this experiment, validation of the labeling of the terminal nodes was not performed, and hence the rejected-images class described above was not taken into consideration.

In particular, the test was carried out using both the set of training images employed for the construction of the classifier and a set of test images which was altogether unrelated to and independent of the set of training images.

In detail, a database of images made up of 4500 images coming from various sources was used. These images consisted of images downloaded from the Web, scanned-in images, and bit-map versions of electronic pages. In particular, the database of images included 2600 photographs, 1300 graphics, and 700 texts.

The various images differed in size (ranging from 120×120 to 1500×1500 pixels), resolution and depth of tone. The classes of photographs included photographs of indoor and outdoor scenes, landscapes, people and things. The class of graphics included banners, logotypes, maps, sketches, and photo-realistic graphics. The class of texts included, instead, digitized manuscript texts, black-and-white and color texts, and scanned or computer-generated texts with various fonts. The classes of texts and graphics comprised images, such as texts with a highly colored background or only a few words in large characters, and photo-realistic graphics, the classification of which may be particularly difficult.

Initially, a number of explanatory trees were constructed using various training sets made up of about 1600 images (approximately 700 photographs, 600 graphics, and 300 texts) drawn at random from the above-mentioned database. In all the experiments, the images not included in the set of training images were used to form a set of test images. In the experiments conducted using the training sets and the explanatory trees, the percentages of correct classification of the images were as follows: photographs, 95%-97%; graphics, 91%-93%; texts, 94%-97%. Instead, in the experiments conducted using the set of test images and the explanatory trees, the percentages of correct classification of the images were as follows: photographs, 90%-91%; graphics, 80%-85%; texts, 89%-91%.

These experiments were then repeated using pruned trees obtained by eliminating those features which captured purely local characteristics, such as the histograms of the colors and the directions of the edges, so obtaining a set of 72 low-level features.

In the experiments carried out using the pruned trees, there was a mean increase in probability of correct classification of 4% for the photographs and 3% for the graphics. In particular, using the training set, the percentages of correct classification of the images increased and were the following: photographs, 97%-98%; graphics, 93%-95%; texts, 93%-96%. Instead, in the set of test images, the percentages of correct classification of the images were the following: photographs, 94%-95%; graphics, 84%-87%; texts, 88%-91%.

From an examination of the characteristics of the method of classification provided according to the present invention, the advantages that this makes possible are evident.

In particular, it is emphasized that the surprising results illustrated above may be achieved with a much smaller exploitation of computational resources than that necessary for the implementation of the methods according to the known art, in that the only real computational effort is represented by the construction of the tree-structured classifier, which occurs only once and outside of the flow of execution in the phase of use of the method.

In addition, the present classification method is highly optimizable and modular, lends itself to an implementation through parallel architectural structures, and is extremely "robust" in so far as the use of a tree-structured classifier eliminates entirely the possibility of not taking into consideration particular cases that might arise in images.

Finally, it is clear that numerous variations and modifications may be made to the classification method described and illustrated herein, without thereby departing from the protection scope of the present invention, as defined by the claims.

We claim:

1. A content-based digital-image classification method comprising:
   describing the semantic content of an image by defining a set of N low-level features including quantities obtained from the image by use of predetermined logico-mathematical expressions;
   indexing the image to be classified to extract therefrom a feature vector formed by values assumed, in said image, by said N low-level features; and
   identifying a class of the image by processing the feature vector according to a processing algorithm, wherein said processing the feature vector according to a processing algorithm comprises:
   defining a feature space as a function of said N low-level features;
   splitting said feature space into a finite number of classification regions each of which is associated a respective image class, and each of which is the locus of the points of the feature space;
   associating said extracted feature vector with one said feature space;
   identifying a specific classification region containing the feature vector; and identifying one said image class associated with said classification region, whereby said image class is associated with the specific classification region identified, wherein said splitting said feature space into a finite number of classification regions further comprises utilizing a tree-structured classifier utilizing recursive partitioning of said feature space according to a predetermined partition criterion.

2. A content-based digital-image classification method, comprising:

defining a set of low-level features describing the semantic content of an image, said features being quantities obtainable from the image by means of logico-mathematical expressions that are known beforehand, and the choice of said features depending upon the image classes used for the classification;

indexing the image to be classified, to extract therefrom a vector of features having components that are formed of values assumed, in said image, by said low-level features;

splitting a feature space defined by the said features into a finite number of classification regions, to each one of said regions there being associated a respective image class, and each of said classification regions being the locus of the points of said feature space defined by a finite set of conditions laid on at least one component of said feature vector;

identifying, among said classification regions, a specific classification region containing said feature vector; and identifying the image class associated to said specific classification region, wherein said features of said set are chosen among the group comprising:

a. the color histogram in the 64-colour quantized HSV color space;
b. the color coherence vectors in the 64-colour quantized HSV color space;
c. the 11-colour quantized color transition histogram in the HSV color space;
d. the moments of inertia of color distribution in the non-quantized HSV color space;
e. the moments of inertia and the kurtosis of the luminance of the image;
f. the percentage of non-colored pixels in the image;
g. the number of colors of the image in the 64-color quantized HSV color space;
h. the statistical information on the edges of the image extracted by means of Canny's algorithm; in particular:
  h1. the percentage of low, medium and high contrast edge pixels in the image;
  h2. the parametric thresholds on the gradient strength corresponding to medium and high-contrast edges;
  h3. the number of connected regions identified by closed high-contrast contours; and
  h4. the percentage of medium-contrast edge pixels connected to high-contrast edges;
i. the histogram of the directions of the edges extracted by means of the Canny's edge detector;
j. the mean value and the variance of the absolute values of the coefficients of the subimages of the first three levels of the multi-resolution Daubechies wavelet transform of the luminance of the image;
k. the estimation of the texture characteristics of the image based on the neighborhood gray-tone difference matrix (NGTDM), in particular coarseness, contrast, busyness, complexity, and strength;
l. the spatial-chromatic histogram of the color regions identified by means of the 11-colour quantization process in the HSV color space, and in particular:
  l1. the co-ordinates of the centroid of the colors; and
  l2. the dispersion of the color regions with respect to their centroids;
m. the spatial composition of the color regions identified by means of the 11-colour quantization process, and in particular:
  m1. fragmentation;
  m2. distribution of the color regions with respect to the center of the image; and
  m3. distribution of the color regions with respect to the x-axis and with respect to the y-axis.

3. A content-based digital-image classification method, comprising:

defining a set of low-level features describing the semantic content of an image, said features being quantities obtainable from the image by means of logico-mathematical expressions that are known beforehand, and the choice of said features depending upon the image classes used for the classification;

indexing the image to be classified, to extract therefrom a vector of features having components that are formed of values assumed, in said image, by said low-level features;

splitting a feature space defined by the said features into a finite number of classification regions, to each one of said regions there being associated a respective image class, and each of said classification regions being the locus of the points of said feature space defined by a finite set of conditions laid on at least one component of said feature vector;

identifying, among said classification regions, a specific classification region containing said feature vector; and identifying the image class associated to said specific classification region, wherein said step of splitting said feature space further comprises:

constructing a tree-structured classifier, by recursively partitioning said feature space according to a pre-set partition criterion.

4. The classification method according to claim 3 wherein said classifier further comprises a binary tree-structured classifier.

5. The classification method according to claim 3 wherein said tree-structured classifier is constructed using the Cart methodology.

6. The classification method according to claim 3 wherein said constructing a tree-structured classifier further comprises:

defining a set of training images which comprises, for each image class, a plurality of images having different characteristics;

indexing each of said training images to extract, from each one of them, a respective said feature vector; and constructing said tree-structured classifier, starting from the image vectors extracted from said training images and from said pre-set partition criterion.

7. The classification method according to claim 3 wherein said partition criterion is such as to render the two descendant nodes deriving from the splitting of a parent node more internally homogeneous in terms of types of images contained therein.

8. The classification method according to claim 3 wherein said constructing said tree-structured classifier further comprises:

labeling nodes of said tree-structured classifier according to a labeling criterion such as to minimize, for each of said nodes, an expected image misclassification cost which is indicative of a reliability of said tree-structured classifier conditioned at said node; and validating labeling of the terminal nodes of said classifier.

9. The classification method according to claim 8 wherein said step of labeling nodes of said tree-structured classifier further comprises carrying out, at least for each one of the terminal nodes of said tree-structured classifier:

a. assigning to the terminal node a respective label indicative of the image class associated to the terminal node itself and chosen from a set of labels that have been predefined on the basis of said labeling criterion;

and at least one of:

a1. determining a cardinality of said terminal node; and a2. determining an image misclassification cost relative to said terminal node, said cost being indicative of a reliability of the tree-structured classifier conditioned at the terminal node; and b. wherein said step of validating the labeling of the terminal nodes of said classifier further comprises carrying out, for each one of said terminal nodes, at least one of:

b1. comparing the cardinality of said terminal node with a threshold cardinality; and b2. comparing the image misclassification cost relative to said terminal node with a threshold image misclassification cost;

and further includes:

b3. modifying the label assigned to said terminal node, should at least one of the following conditions have occurred:

b4. the cardinality of said terminal node has a first pre-set relationship with said threshold cardinality;

b5. the image misclassification cost relative to said terminal node has a second pre-set relationship with said threshold image misclassification cost; and b6. validating the label assigned to the terminal node in the event of neither of the above conditions having occurred.

10. The classification method according to claim 9 wherein said first pre-set relationship is further defined by the condition that the cardinality of said terminal node is smaller than said threshold cardinality, and said second pre-set relationship is further defined by the condition that the image misclassification cost relative to said terminal node is higher than said threshold image misclassification cost.

11. The classification method of claim 1 wherein said tree-structured classifier further comprises a binary-tree constructed by:

defining a set of training images which include a plurality of images having different characteristics for each image class;

indexing each said training image to extract a respective feature vector from each said training image; and constructing said binary tree-structured classifier by performing a recursive binary partition procedure as a function of both said feature vectors extracted from said training images and said predetermined partition criterion.

12. The classification method of claim 11 wherein said indexing each of the training images to extract a respective feature vector from each said training image includes components represented by said values assumed.

13. The classification method of claim 11 wherein said constructing said binary tree-structured classifier includes utilizing a construction method substantially defined by:

said predetermined partition criterion;

a construction-procedure termination criterion; and a terminal-node labeling criterion.

14. The classification method of claim 13 wherein said terminal-node labeling criterion is chosen to minimize the likelihood of image misclassification.

15. The classification method of claim 14 wherein said terminal-node labeling criterion further comprises assigning to each said node:

an image misclassification cost relative to said node, which is indicative of the reliability of the classifier conditioned at said node;

a label naming said class of images chosen among a set of predefined labels such as to minimize said image misclassification cost relative to said node;

a cardinality of each said node defining a total number of said training images which, during the construction of said classifier, have reached said node; and a probability distribution of said labels in said node.

16. The classification method of claim 15 further comprising performing a label validation procedure, including comparing a cardinality associated with each said terminal node with a threshold cardinality, and comparing a misclassification cost associated with each said terminal node with a threshold misclassification cost.

* * * * *